United States Patent
Betz et al.

[11] Patent Number: 5,909,888
[45] Date of Patent: Jun. 8, 1999

[54] TWIST-BEAM REAR AXLE FOR MOTOR VEHICLES

[75] Inventors: Christian Betz, Bergisch-Gladbach; Tong Zhang, Pulheim, both of Germany

[73] Assignee: Ford Global Technologies, Inc., Dearborn, Mich.

[21] Appl. No.: 09/030,878

[22] Filed: Feb. 26, 1998

[30] Foreign Application Priority Data

Feb. 26, 1997 [DE] Germany ............................ 197 07 643

[51] Int. Cl.⁶ .................................................. B60G 11/18
[52] U.S. Cl. .................................................. 280/124.166
[58] Field of Search .................... 280/124.166, 124.137, 280/124.104; 180/905; 301/124.1

[56] References Cited

U.S. PATENT DOCUMENTS

| | | | |
|---|---|---|---|
| 4,486,030 | 12/1984 | Takata et al. | 280/124.166 |
| 5,409,254 | 4/1995 | Minor et al. | 280/124.166 |
| 5,409,255 | 4/1995 | Alatalo et al. | 280/124.166 |
| 5,518,265 | 5/1996 | Bathala et al. | 280/124.166 |
| 5,813,691 | 9/1998 | Aoki et al. | 280/124.166 X |

FOREIGN PATENT DOCUMENTS

44-41-971 A1  11/1994  Germany.

*Primary Examiner*—Christopher P. Ellis
*Attorney, Agent, or Firm*—Gregory P. Brown

[57] ABSTRACT

A twist-beam rear axle for motor vehicles includes a flexurally stiff but torsionally compliant cross strut (2) which is combined with flexurally and torsionally stiff longitudinal arms (3) carrying an axle coupling (6) and a hub carrier (7). The cross strut (2) consists of an extruded aluminum channel section which determines the position of the roll center (RC) and of which the open-bottom U-shaped cross-section has closed chambers (25 and 26) at the free ends of its sides (21 and 22). At the ends of the cross strut (2) the sides (21 and 22) of the section are separated and are bent apart outwards to form portions of the longitudinal arms (3) which are closed by corresponding shaped members (8). Upper and lower chambers (23, 24 and 25, 26) are provided in each side (21 and 22) of the section allowing tuning of the torsional rigidity of the cross strut.

5 Claims, 10 Drawing Sheets

TWIST-BEAM REAR AXLE FOR MOTOR VEHICLES

BACKGROUND OF THE INVENTION

1. Field of the Invention

The present invention relates to a twist-beam rear axle for motor vehicles. More particularly, the present invention relates to the use of aluminum extrusions to form a flexurally stiff but torsionally compliant cross strut and flexurally and torsionally stiff longitudinal arms.

2. Disclosure Information

A twist-beam rear axle of this kind for motor vehicles is known from German patent specification 44 41 971, wherein the cross strut is formed from a section which determines the position of the roll center and is in the form of an extruded aluminum channel section of which the open-bottom U-shaped cross-section is provided with closed chambers at the free ends of the sides of the section.

In this case the cross struts, after separation, or removal of a connecting piece, and bending the two sides apart outwards, form regions for the longitudinal arms which are formed by closure with corresponding shaped members.

The known twist-beam rear axle has the disadvantage that the U-shaped cross-section of the extruded aluminum channel section forming the cross strut has an undesirably high warping constant, which impairs the fatigue strength of the twist-beam rear axle. On alternating spring deflection, and thus twisting, of the cross strut the normal stresses set up in the transition region between the cross strut and the longitudinal arm are so high that cracks are formed after only a short time. In addition, the torsion constant which can be achieved is too small.

It is an object of the invention to provide a twist-beam rear axle of the kind referred to above capable of obtaining, by means of a correspondingly optimised cross-section of the cross strut in the form of an extruded aluminum channel section, as low a warping constant as possible together with high bending strength, particularly about the vertical axis, and increased torsional stiffness. Furthermore the particular position of the roll center also plays a significant part.

SUMMARY OF THE INVENTION

To achieve this object, in order to minimise the warping constant, the section forming the cross strut is given a combined U- and V-shape, with the sides having an overall upward sweep, and closed chambers are also provided in the sides of the section at their closed ends, and optionally also in the base, to adjust the torsion constant.

As a result of the combined U-and V-shape of the open-bottom cross-section of the cross strut, with the sides of the section exhibiting an overall upward sweep, and of also providing closed chambers in the sides at their closed ends as well as optionally at the base, with the upper and lower chambers in the sides of the section being shaped and disposed so that their walls have a generally X-shaped loop contour, a twist-beam rear axle for motor vehicles is obtained which has a substantially reduced warping constant and of which the torsion constant is almost doubled.

Further features and advantages of the invention will be apparent from the following description.

BRIEF DESCRIPTION OF THE DRAWINGS

The invention will now be described in more detail, by way of example, with reference to embodiments shown in the accompanying drawings, in which.

DETAILED DESCRIPTION OF THE PREFERRED EMBODIMENT

Figure 1:
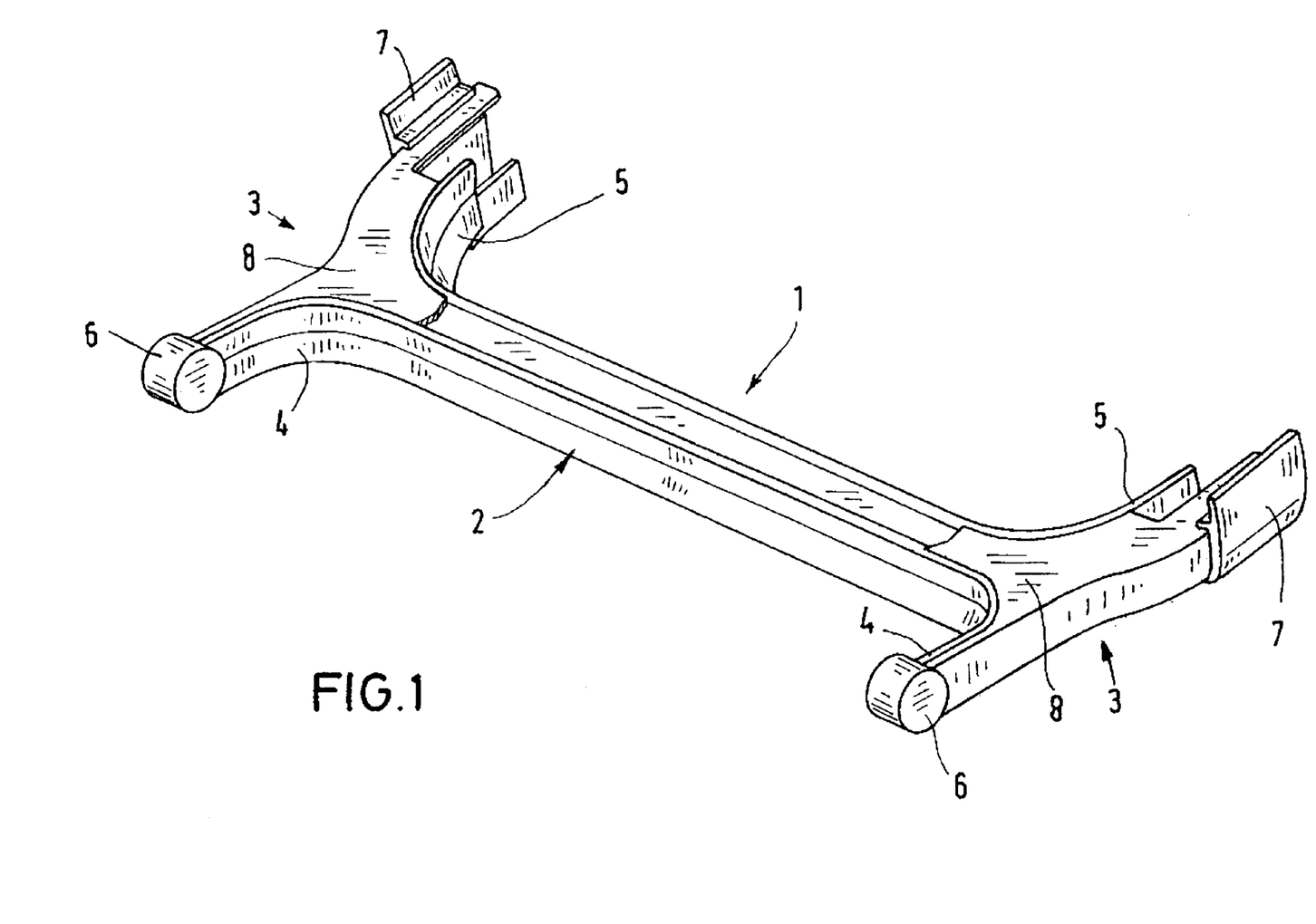
FIG. 1 is a perspective view of the twist-beam rear axle in accordance with the invention.
Figure 6:
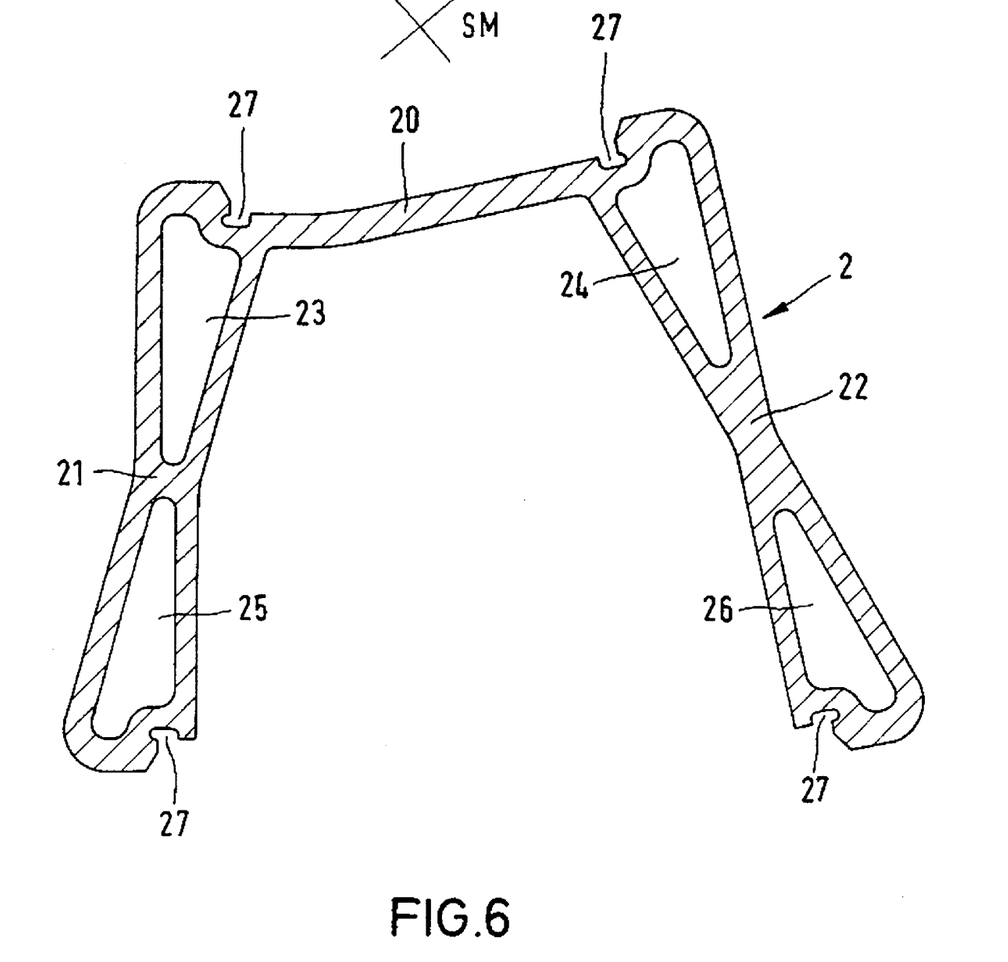
FIG. 6 is a cross-section of the cross strut in accordance with the invention.

The twist-beam rear axle shown in FIG. 1 consists essentially of a cross strut 2 having an open-bottom cross section and of the longitudinal arms 3, each of which carries a coupling eye 6 for fastening the twist-beam rear axle to the body of the vehicle and a hub carrier 7 for mounting the wheels carried by the twist-beam rear axle. An embodiment for a suitable section of the cross strut 2 is shown in FIG. 6.

Figure 2:
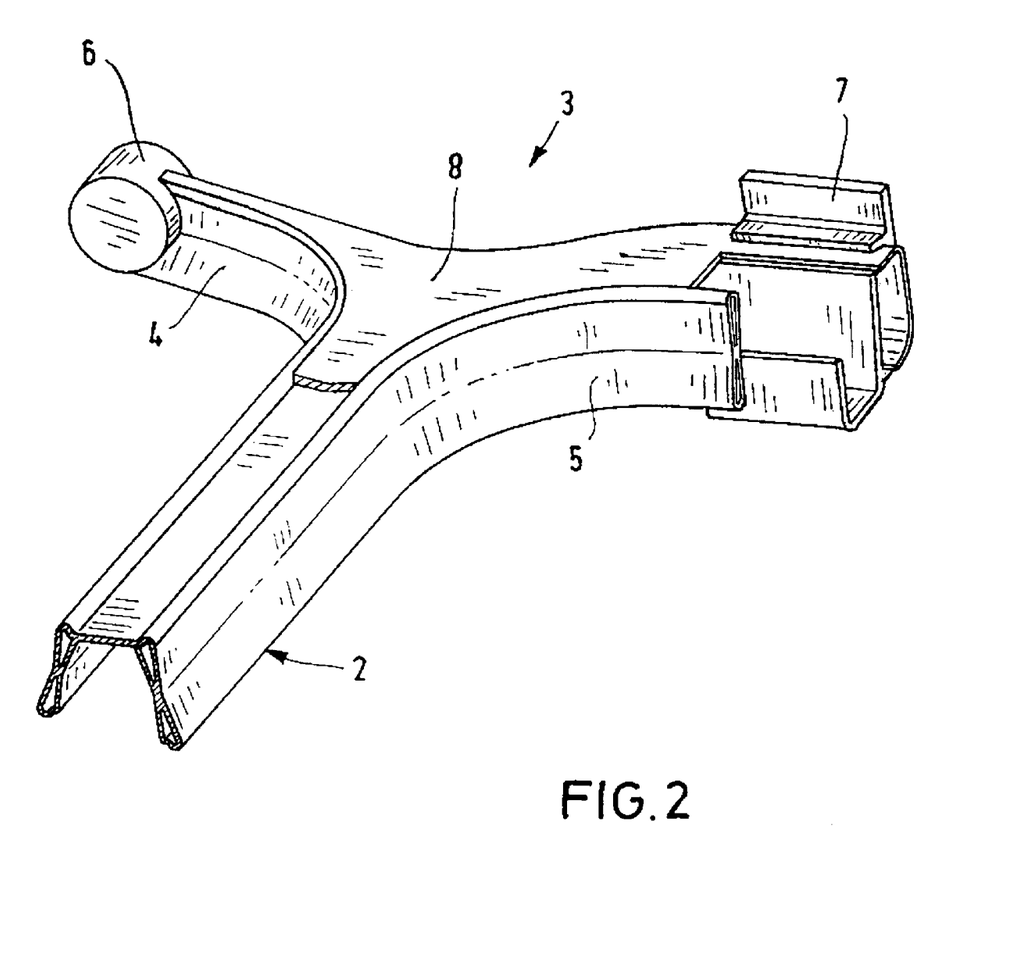
FIG. 2 is a partial view from above of the transition region from the cross strut to the axle coupling and the longitudinal arm.

As can be seen from FIG. 2, the longitudinal arms 3 are formed by portions of the cross strut 2, the inner walls 4 and 5 of the longitudinal arms 3 being formed by separating the two sides of the section at the ends of the cross strut and bending them apart respectively forwards and backwards, and then closing the longitudinal arms by means of corresponding shaped members 8 which are fastened by welding or bonding.

Figure 3:
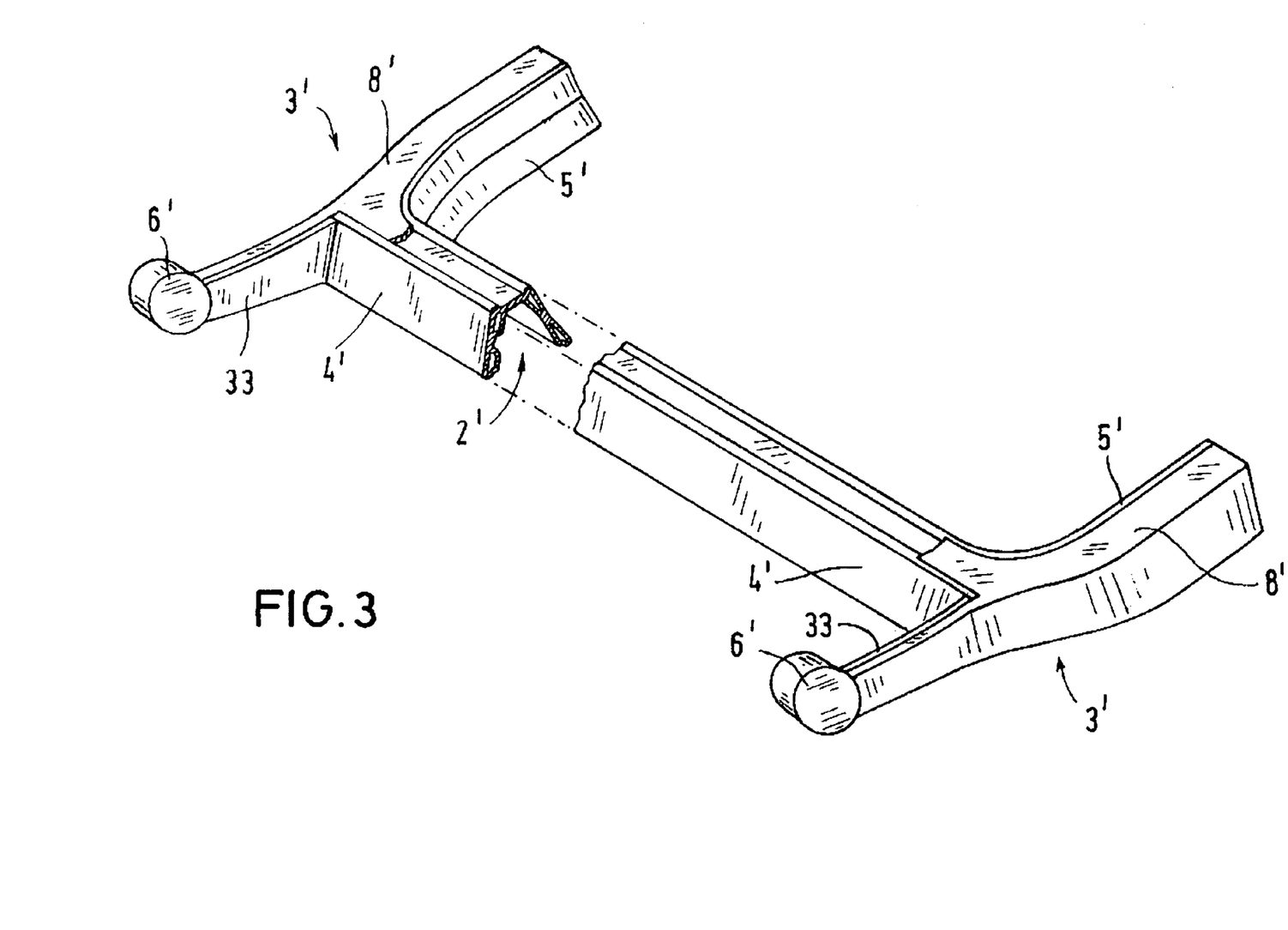
FIG. 3 is a perspective view of a further embodiment of the twist-beam rear axle with a different form of the transition area between the twist-beam and the longitudinal arm.
Figure 7:
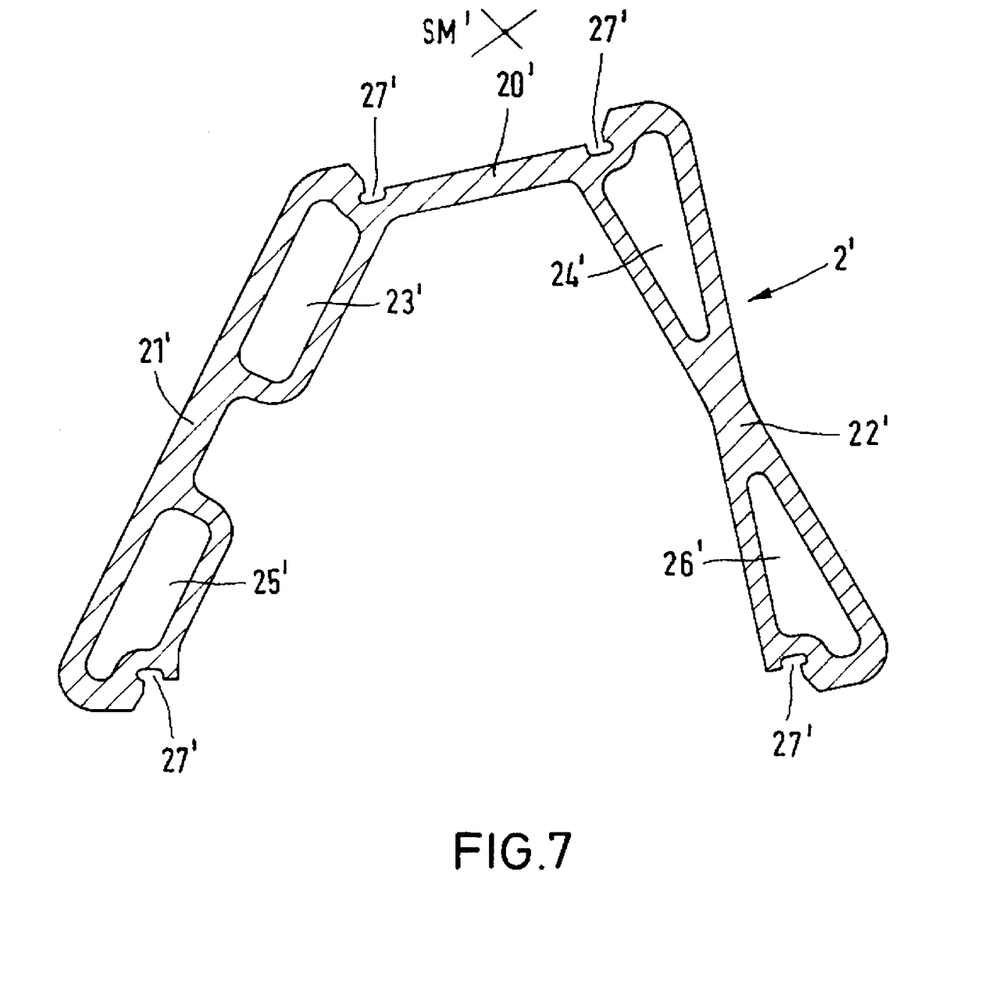
FIG. 7 is a further cross-section of another embodiment of the cross strut in accordance with the invention.

FIG. 3 shows a different embodiment of the twist-beam rear axle with a section according to FIG. 7. Referring back now to FIG. 3, the front wall 4' of the cross strut 2' continues until the shaped member 8' of the longitudinal arm 3' and is cut-off at that area. The connection of the longitudinal arm 3' is made via the welding pocket 27'; see FIG. 7 and via an additional closing piece 33. From a conceptual standpoint, the main advantage of such a design lies in a reduction of the height of the front part of the longitudinal arm 3' and in a gain of space in avoiding the front bending radius of the wall 4' of the longitudinal arm 3' (Compare FIG. 3 and FIG. 2).

Figure 4:
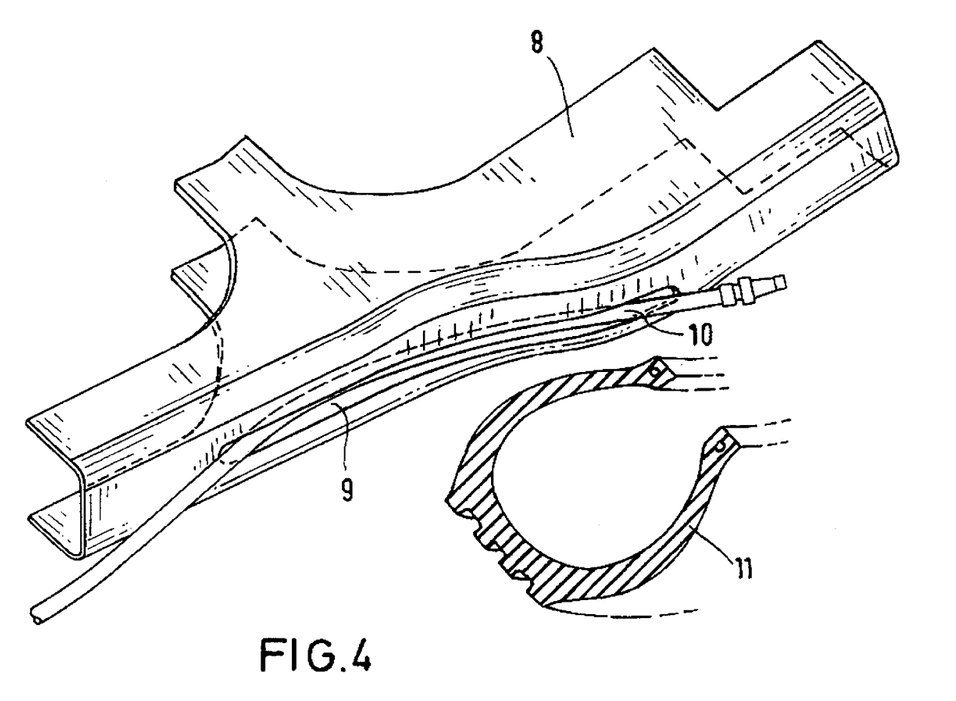
FIG. 4 is a partial view of the longitudinal arm with an integral hand brake cable guide.

Such a shaped member 8 for the longitudinal arm 3 is shown in FIG. 4. A groove 9 is integrated in the shaped member 8 for the longitudinal arm which serves as a guide for the hand brake cable 10, thereby making optimum space available for the tire 11 and thus maximising the stiffness of the longitudinal arm.

The special cross-section of the cross strut 2 is shown in more detail in FIG. 6. The cross strut has a cross-section which is open at the bottom and is formed as a combined U- and V-shape with a single-walled base 20 and two double-walled sides 21 and 22. The sides 21 and 22 have upper and lower chambers 23, 24 and 25, 26 respectively, which give each of the walls an X-shaped loop contour.

Welding bath connections or pockets 27 in the form of groove-shaped incisions or channels are integrated in the sides 21 and 22 at their lower ends and at their transition to the base 20; these are provided in order to facilitate subsequent welding to the shaped member 8 or to the hub carrier 7.

Increasing the inclination of the rear side 22 of the section results in an increased divergence of the two sides 21 and 22 of the section relative to one another, which again contributes to a reduction in the warping constant.

The inclined position of the rear side further permits bending of the rear part 5 of the longitudinal arm upwards out of the horizontal plane of the cross strut 2, which enables the hub carrier 7 to be integrated to the greatest possible extent into the longitudinal arm 3 and thus results in savings in material and weight.

Figure 5:
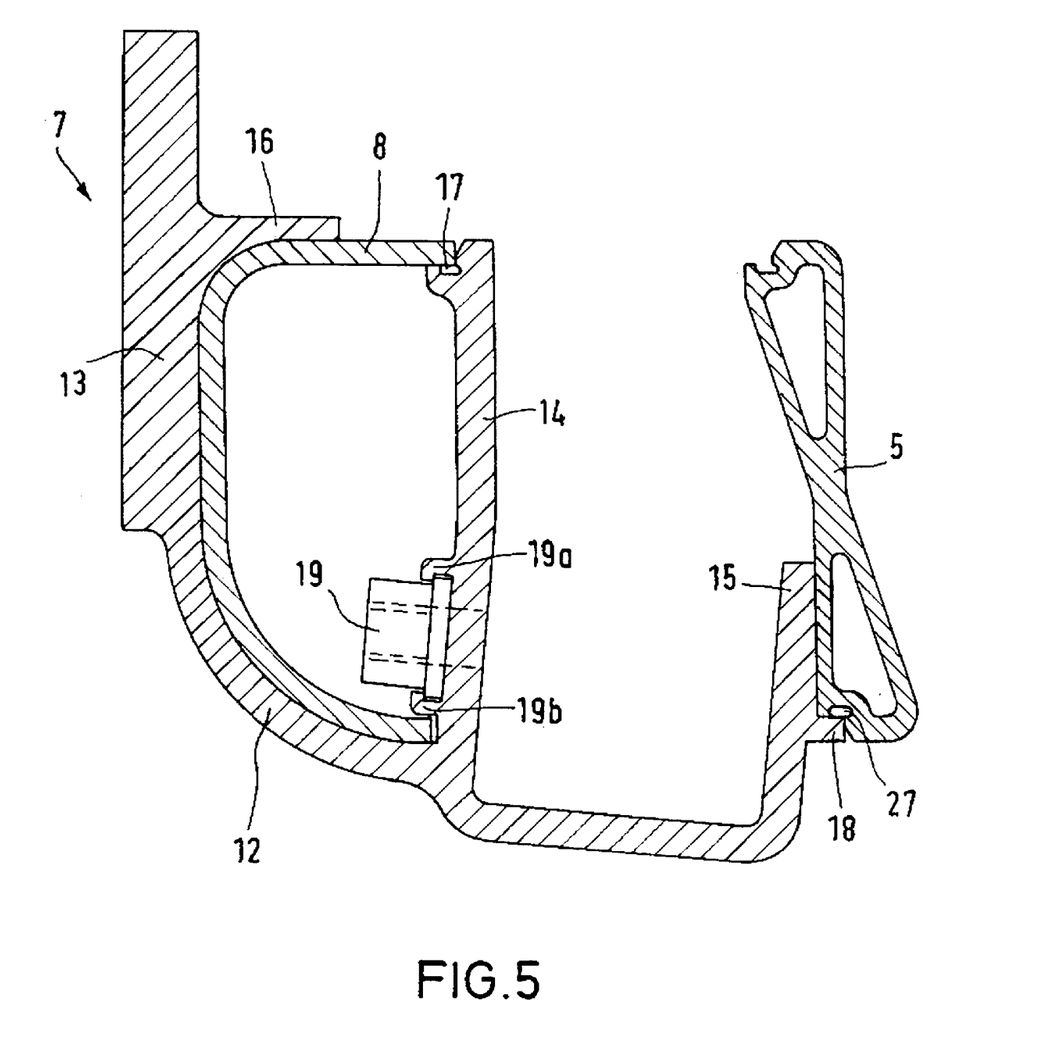
FIG. 5 is a partial section in the rear region of the longitudinal arm with a one-piece hub carrier formed as an extruded section.

Suitable shaping of the cross-section of the base 20 and of the sides 21 and 22 of the section results in the position of the roll center (RC) for such a twist-beam rear axle being very favourable, since as a result of its high spatial position tendencies to understeer are promoted. FIG. 5 shows the connection of the hub carrier 7 with the longitudinal arm 3, which in its rear area is formed by the bent-off end 5 of the cross strut 2 and a part of the shaped member 8 which at that space has been cut away partly The hub carrier 7 consists of a one-piece pressed profile with a somewhat W-shaped section wherein the hub carrier plate 13 and the bracket 14 and 15 for the damper are integrated. The hub carrier 7 includes a welding flange 16 and an arcuate wall 12 form fitting against the shaped member 8. The vertical center wall 14 closes against the shaped member 8 with a welding pocket 17 and as such forms a side wall of the u-shaped section which forms the damper support bracket. The vertical outer wall 15 is connected via a welding flange 18 and a welding pocket 27 with the rear wall 5 of the cross strut 2 by welding or bonding. The nut to which is needed to fasten the lower end of the damper is inserted into receiving pockets 19a and 19b which are provided at the wall 14.

By means of the receiving area of the hub carrier 7 with its partly form fitting connection to the shaped member 8, a very strong connection with the rear part of the longitudinal arm 3 is reached.

Figure 8:
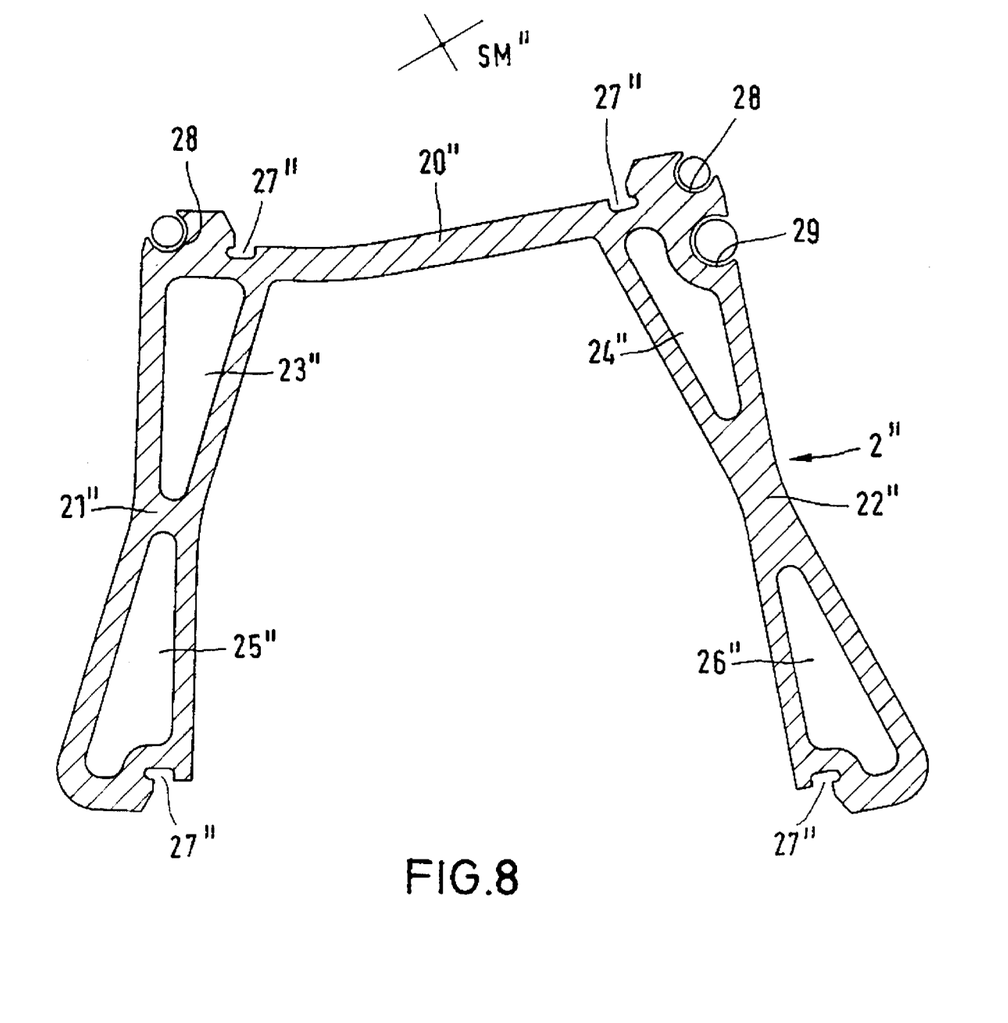
FIG. 8 is a cross-section through the cross strut of the invention with devices in accordance with the invention for holding brake lines and ABS sensor cables.

In FIG. 8, a further embodiment of a cross strut in accordance with the invention is shown in which the same numbers are again used, distinguished by a double dash.

In the case of the cross strut 2" shown in FIG. 8, which basically corresponds to the cross strut shown in FIG. 7, further groove-shaped incisions 28 and 29, serving to hold cylindrical members such as brake lines and the cable of ABS sensors, can be provided in the course of manufacture of the extruded section beside the already integrated welding pockets 27. In this way not only can a very easy-to-build and robust twist-beam rear axle for motor vehicles be provided, but also its completion by necessary assembly parts is considerably simplified.

Figure 9:
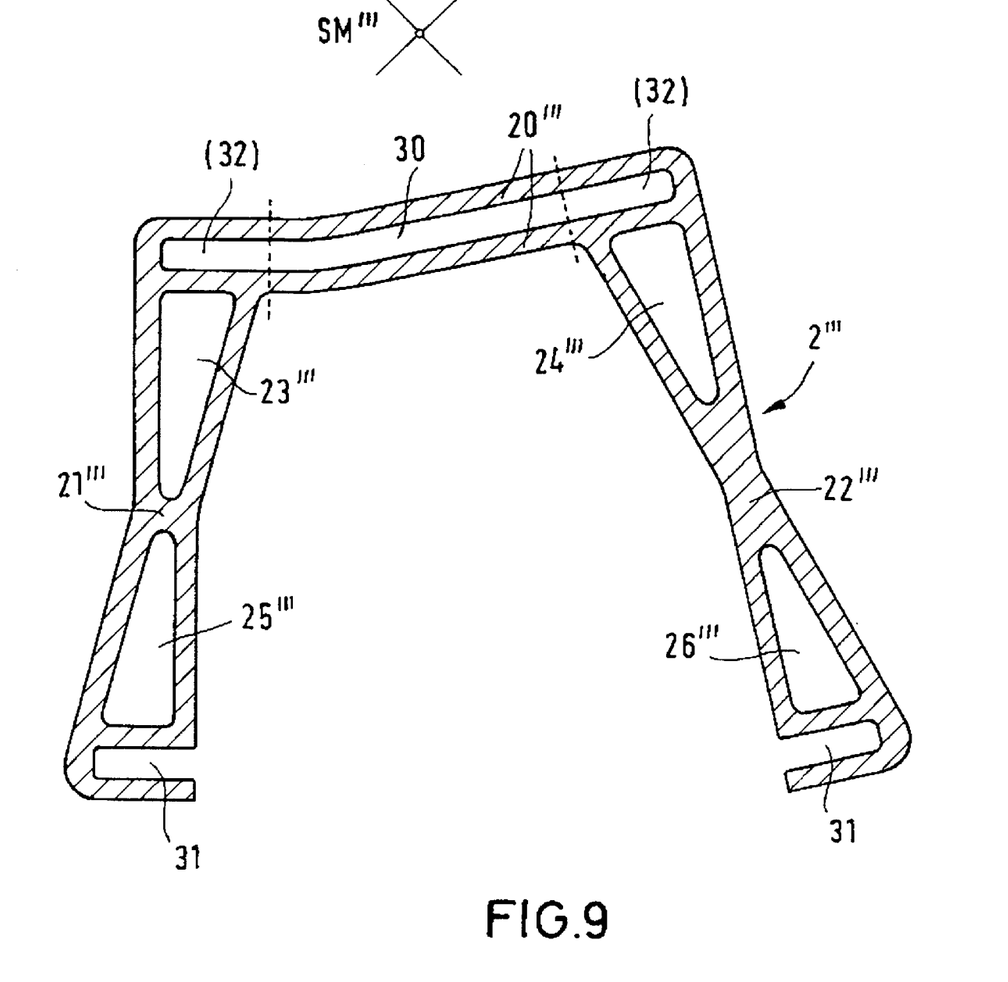
FIG. 9 is a cross-section through the cross strut of the invention with an additional chamber in the base of the section and devices which facilitate sticking together instead of welding.

FIG. 9 shows an alternative embodiment of the cross strut of the invention, the same reference numerals being distinguished by the use of triple dashes.

The important difference of the cross-section of the cross strut 2''' from the previous embodiments of the cross strut 2, 2' and 2" lies in that not only do the sides 21''' and 22''' each have two chambers 23''', 25''' and 24''', 26''', but the base 20''' also includes a chamber 30. Further, instead of the groove-shaped incisions which previously functioned as welding pockets, grooves 31 are formed at the lower ends of the sides 21''' and 22''' and after a second of the base between the dashed lines is removed through the separation of sides 21''' and 22''' a pair of second welding pockets or grooves (32) will remain in the upper ends of the side of the section from the chamber 30 in the base 20''' and serve to cooperate with the shaped member 8 to close the cross strut by welding or bonding within these grooves.

Figure 10:
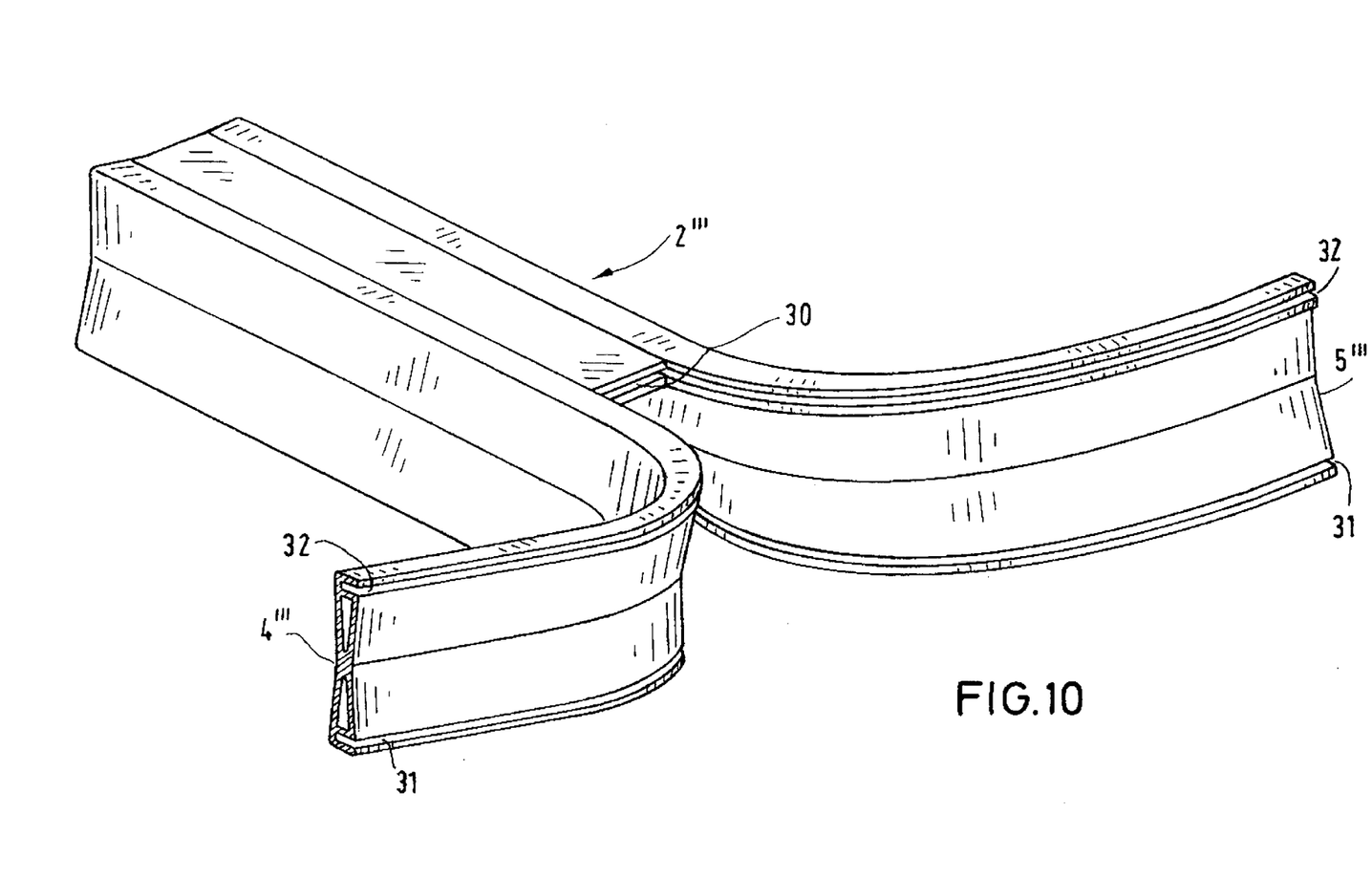
FIG. 10 is a perspective view of the transition region from the cross strut provided with adhesion grooves to the longitudinal arm with an axle coupling and hub carrier.

FIG. 10 shows a twist-beam rear axle in accordance with the invention having a cross strut 2''' of this kind in which the adhesive grooves 31, 32 at the bent-out ends 4''' and 5''' and the chamber 30 of the base 20''' serve to connect the cross strut to the shaped member 8 forming the longitudinal arm 3.

Various modifications and variations will no doubt occur to those skilled in the art to which this invention pertains. Those and all other variations which basically rely on the teachings by which this disclosure has advanced the art are properly considered within the scope of this invention as defined by the appended claims.

What is claimed is:

1. A twist-beam rear axle for motor vehicles, comprising:

a flexurally stiff but torsionally compliant cross strut having connected, at each of its ends, flexurally and torsionally stiff longitudinal arms having a shaped member which carries an axle coupling and a hub carrier;

said cross strut being constructed from a single extruded channel having a cross section and properties selected to position a roll center of the twist beam rear axle;

said cross section having an open-bottom U-shape with sides having closed ends at each end of a base and free ends opposite said closed ends, said free ends, closed ends and said base each having separate closed chambers formed therein;

said sides of said cross section being vertically oriented in a non-parallel, diverging relationship, thereby increase warping resistance of said section;

said sides, at said ends of said cross strut, further being separated and bent apart outwards to form portions of said longitudinal arms which are connected to shaped members; and said closed chambers being independently selectable in size and shape to adjust a torsional constant of said cross strut.

2. The twist-beam rear axle of claim 1, wherein said sides are bent apart forwards and backwards upwardly from a plane of said open-bottom U-shaped cross strut.

3. The twist-beam rear axle of claim 1, wherein only one of said sides is bent upwardly from a plane of said open-bottom U-shaped cross strut.

4. The twist-beam rear axle of claim 1, wherein said cross section further includes grooves formed in the extruded section of the cross strut to receive cylindrical members in a snap fit relationship.

5. The twist-beam rear axle of claim 1, wherein said shaped member of the longitudinal arm has an impressed groove in which the hand brake cable is guided.

* * * * *